(12) United States Patent  
Fothergill (10) Patent No.: US 8,108,380 B2
(45) Date of Patent: Jan. 31, 2012

(54) INCLUSION OF METADATA IN INDEXED COMPOSITE DOCUMENT

(75) Inventor: Alan Fothergill, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 274 days.

(21) Appl. No.: 12/041,011

(22) Filed: Mar. 3, 2008

(65) Prior Publication Data

US 2009/0222434 A1 Sep. 3, 2009

(51) Int. Cl.
*G06F 7/00* (2006.01)
(52) U.S. Cl. ......... 707/708; 707/711; 709/216; 709/217
(58) Field of Classification Search .................... 707/708
See application file for complete search history.

(56) References Cited

U.S. PATENT DOCUMENTS

| 2004/0194141 A1* | 9/2004 | Sanders ........................... 725/53 |
| 2005/0187915 A1* | 8/2005 | De Lury et al. .................... 707/3 |
| 2008/0082495 A1* | 4/2008 | Polo-Malouvier et al. ....... 707/3 |

* cited by examiner

*Primary Examiner* — Fazlul Quader
(74) *Attorney, Agent, or Firm* — Kilpatrick Townsend & Stockton LLP (57) ABSTRACT

Embodiments of the invention provide systems and methods for searching business objects. According to one embodiment, a method of searching one or more business objects can comprise receiving a set of search criteria and identifying attributes of the business object that match the search criteria by searching an indexed composite document representing the business object based on the search criteria. The indexed composite document can comprise an indication of a value of one or more attributes of the business object and metadata associated with at least one of the values. Searching the indexed composite document can comprise performing a keyword search on the metadata of the composite document based on the search criteria. An indication of the identified attributes of the business object can be returned ordered by relevance to the search criteria.

13 Claims, 6 Drawing Sheets

INCLUSION OF METADATA IN INDEXED COMPOSITE DOCUMENT

BACKGROUND OF THE INVENTION

Embodiments of the present invention relate generally to searching a corpus of information and more particularly to searching a business object based on an indexed composite document representing the business object.

Business objects such as documents, tables, etc., stored in a database or other repository can be searched via applications that use, maintain, or access the information therein. In an enterprise application or other application that provides for searching a business object, typically does so through a Structured Query Language (SQL) or similar query. For example, a user can specify though a user interface one or more attributes of the business object to be found. Using the specified attributes, a query can be run against the business objects and records containing the specified attributes can be returned or reported to the user.

However, there are many limitations with using an SQL query or similar languages or methods to search a database or other corpus of information. For example, in order for attributes specified as a condition of the search to be effective in identifying relevant records of the business object, the user should enter the appropriate attribute names. However, this requires a correct knowledge of the attributes and their names. Use of incorrect names as search criteria can filter the search results in unnecessary or undesirable ways. As a result, users may exclude some criteria that they intend to filter on if they do not know or are not sure of the correct attribute name. In such cases, too many results may be returned. Furthermore, the results are not ordered by relevance such that the important entries appear at the top making it hard for the user to locate what he is looking for. Hence, there is a need for improved methods and systems for searching business objects.

BRIEF SUMMARY OF THE INVENTION

Embodiments of the invention provide systems and methods for searching business objects. According to one embodiment, a method of searching one or more business objects can comprise receiving a set of search criteria and identifying attributes of the business object that match the search criteria by searching an indexed composite document representing the business object based on the search criteria. The indexed composite document can comprise an indication of a value of one or more attributes of the business object and metadata associated with at least one of the values. Searching the indexed composite document can comprise performing a keyword search on the metadata of the composite document based on the search criteria. An indication of the identified attributes of the business object can be returned. Returning the indication of the identified attributes can comprise returning the indications of the values of the attributes that match the search criteria and the associated metadata from the indexed composite document. The indications of the values of the attributes and the associated metadata can be ordered by relevance to the search criteria.

Prior to receiving the set of search criteria, the value of one of attributes of the business object can be read and the indication of the value of the attribute can be stored in the indexed composite document. In some cases, the value of the attribute can be converted to text and the text can be stored as the indication of the value of the attribute. The metadata can be assigned to the value of the attribute. The metadata may not be indicated by the attributes of the business object but can identify the attribute and may also comprise text. In some cases, storing the indication of the value of the attribute in the indexed composite document can comprise concatenating the indication of the value of the attribute and the assigned metadata to the indexed composite document.

In some cases, the search criteria can be recorded. In such a case, attributes of the business object represented in the composite document and associated with the recorded search criteria can be identified and the metadata associated with the indication of the value of the identified attributes can be updated based on the recorded search criteria.

According to another embodiment, a system can comprise a processor and a memory communicatively coupled with and readable by the processor. The memory can have stored therein a series of instructions which, when executed by the processor, cause the processor to receive a set of search criteria and identify attributes of the business object that match the search criteria by searching an indexed composite document representing the business object based on the search criteria. The indexed composite document can comprise an indication of a value of one or more attributes of the business object and metadata associated with at least one of the values. Searching the indexed composite document can comprise performing a keyword search on the metadata of the composite document based on the search criteria. An indication of the identified attributes of the business object can be returned. Returning the indication of the identified attributes can comprise returning the indications of the values of the attributes that match the search criteria and the associated metadata from the indexed composite document. The indications of the values of the attributes and the associated metadata can be ordered by relevance to the search criteria.

The instruction can also cause processor, prior to receiving the set of search criteria, to read the value of one of attributes of the business object, store the indication of the value of the attribute in the indexed composite document, and assign the metadata to the value of the attribute. In some cases the instruction can further cause processor to record the search criteria. In such cases, the instructions can further cause the processor to identify attributes of the business object represented in the composite document and associated with the recorded search criteria and update the metadata associated with the indication of the value of the identified attributes based on the recorded search criteria.

According to yet another embodiment, a machine-readable medium can have stored thereon a series of instruction which, when executed by a processor, cause the processor to search one or more business objects by receiving a set of search criteria and identifying attributes of the business object that match the search criteria by searching an indexed composite document representing the business object based on the search criteria. The indexed composite document can comprise an indication of a value of one or more attributes of the business object and metadata associated with at least one of the values. Searching the indexed composite document can comprise performing a keyword search on the metadata of the composite document based on the search criteria. An indication of the identified attributes of the business object can be returned. Returning the indication of the identified attributes can comprise returning the indications of the values of the attributes that match the search criteria and the associated metadata from the indexed composite document. The indications of the values of the attributes and the associated metadata can be ordered by relevance to the search criteria.

Prior to receiving the set of search criteria, the value of one of attributes of the business object can be read. The indication of the value of the attribute can be stored in the indexed composite document and the metadata can be assigned to the value of the attribute. The metadata can identify the attribute. In some cases, the search criteria may be recorded. In such cases, attributes of the business object represented in the composite document and associated with the recorded search criteria can be identified and the metadata associated with the indication of the value of the identified attributes can be updated based on the recorded search criteria.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for searching one or more business objects. Generally speaking, embodiments of the present invention provide for searching a business object based on an indexed composite document separate from but representing the business object. The indexed composite document can include all or some subset of all values in related tables making up a business object and concatenated together into a document. That is, the indexed composite document can represent the values of the attributes making up the business object and the relationships between the attributes and tables. Such a document can then be indexed with metadata describing the attributes so that the business attribute can be searched by applying a keyword search to the metadata of the indexed composite document. For example, the metadata can include text describing the attribute values stored in the indexed composite document but that is different from attribute names or other information included in the original tables. Therefore, a keyword search performed on the metadata of the indexed composite document can identify attribute values that would not be found by a typical query of the tables making up the business object. Furthermore, the metadata can be expanded and/or updated to provide additional flexibility to such searches. For example, the metadata can be updated or expanded based on historical data, i.e., based on previous search criteria used.

Stated another way, searching one or more business objects can comprise receiving a set of search criteria and identifying attributes of the business object that match the search criteria by searching an indexed composite document representing the business object based on the search criteria. The indexed composite document can comprise an indication of a value of one or more attributes of the business object and metadata associated with at least one of the values. Searching the indexed composite document can comprise performing a keyword search on the metadata of the composite document based on the search criteria. An indication of the identified attributes of the business object can be returned. Returning the indication of the identified attributes can comprise returning the indications of the values of the attributes that match the search criteria and the associated metadata from the indexed composite document. The indications of the values of the attributes and the associated metadata can be ordered by relevance to the search criteria.

Prior to receiving the set of search criteria, the value of one of attributes of the business object can be read and the indication of the value of the attribute can be stored in the indexed composite document. In some cases, the value of the attribute can be converted to text and the text can be stored as the indication of the value of the attribute. The metadata can be assigned to the value of the attribute. The metadata may not be indicated by the attributes of the business object but can identify the attribute and may also comprise text. In some cases, storing the indication of the value of the attribute in the indexed composite document can comprise concatenating the indication of the value of the attribute and the assigned metadata to the indexed composite document.

In some cases, the search criteria can be recorded. In such a case, attributes of the business object represented in the composite document and associated with the recorded search criteria can be identified and the metadata associated with the indication of the value of the identified attributes can be updated based on the recorded search criteria. Additional details of various embodiments of the present invention will be described below with reference to the figures.

Figure 1:
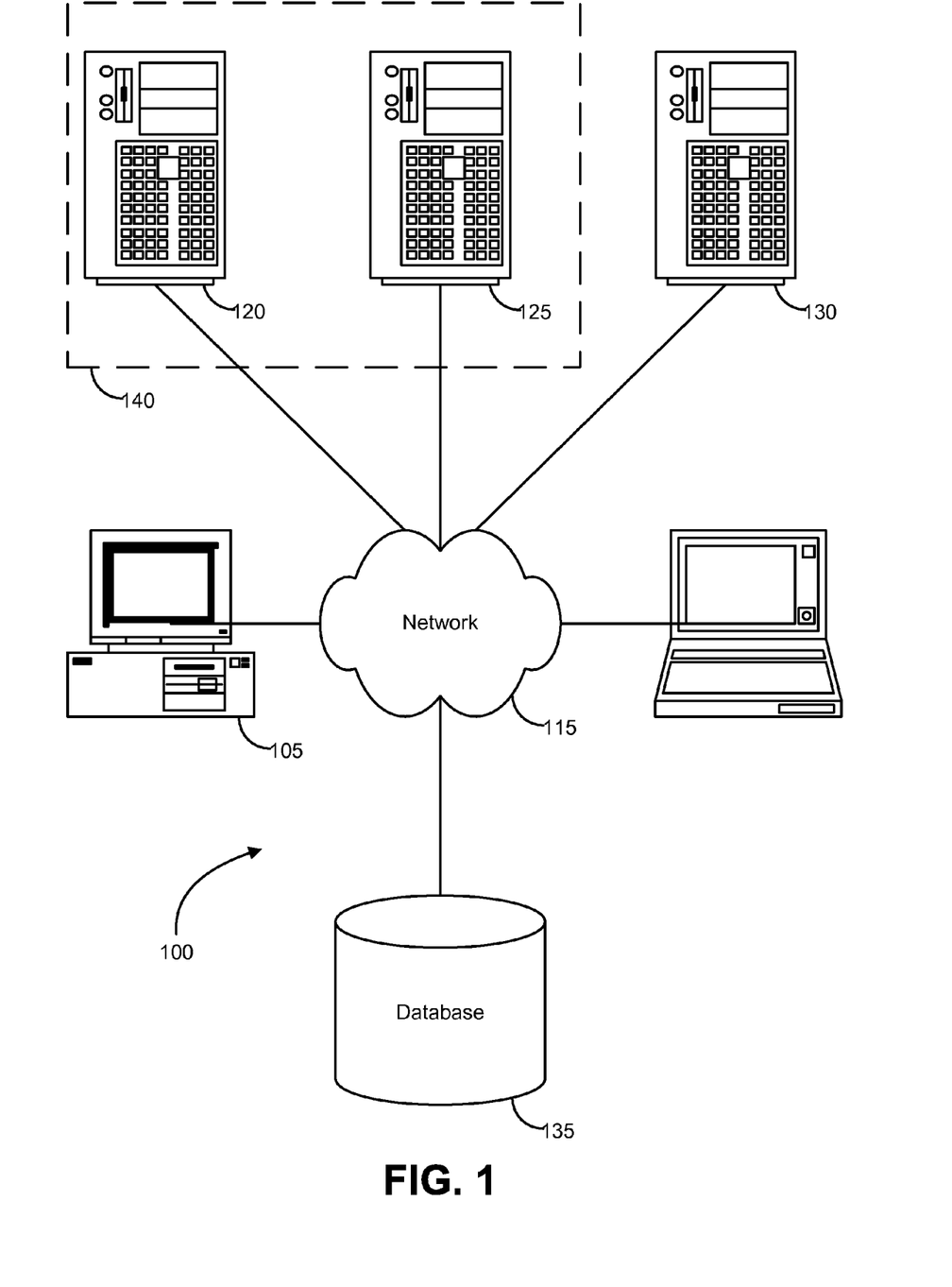
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
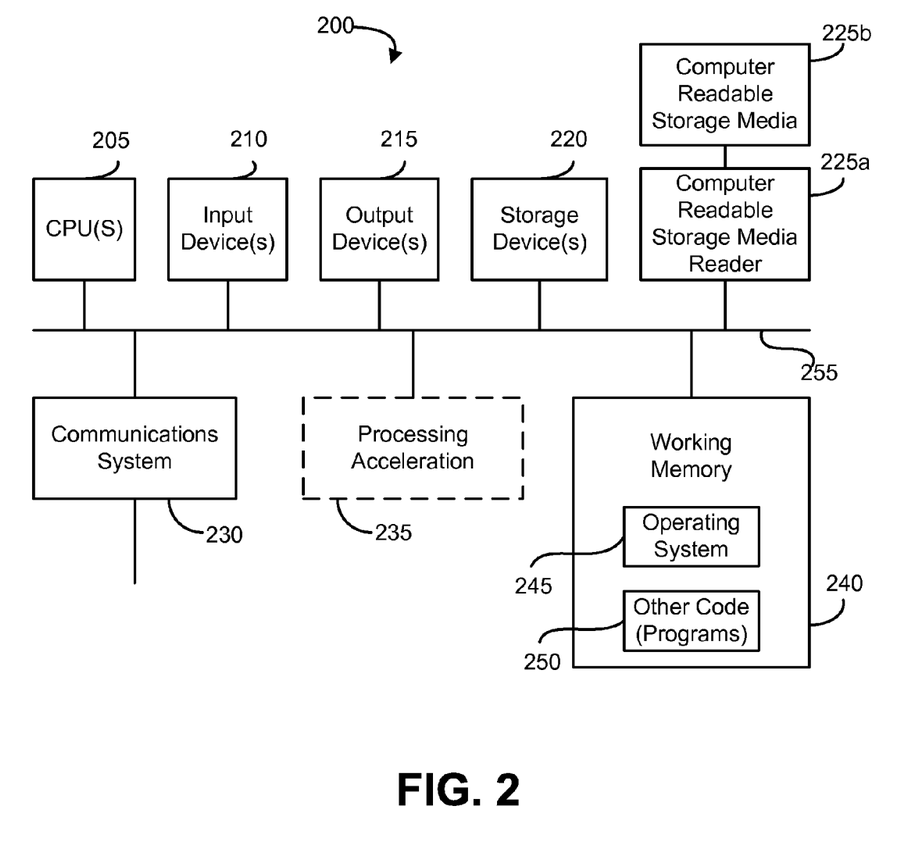
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs)

205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
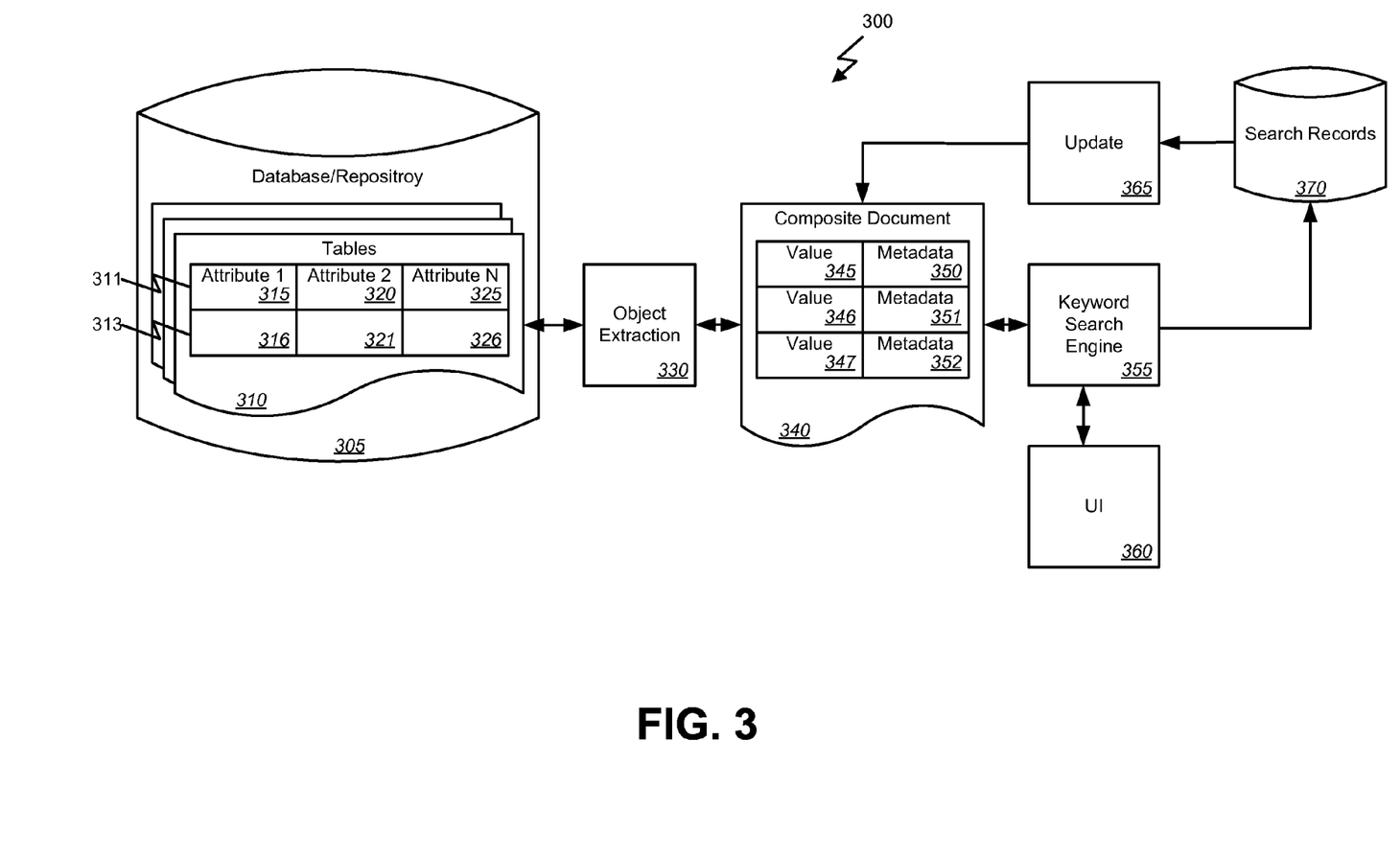
FIG. 3 is a block diagram illustrating, at a high-level, functional components of a system for searching one or more business objects according to one embodiment of the present invention.

FIG. 3 is a block diagram illustrating, at a high-level, functional components of a system for searching one or more business objects according to one embodiment of the present invention. In this example, the system 300 includes a database 305 or other repository containing a corpus of information. The information in the database 305 can be organized into one or more tables 310. Each table 310 can include a number of records 311 and 313 with each record 311 and 313 including any number of attributes 315, 320, 325, 316, 321, and 326. As known in the art, the attributes 315, 320, 325, 316, 321, and 326, records 311 and 313, and tables 310 can be organized and/or linked together in various ways to represent a business object.

As illustrated here, the system 300 can also include an object extraction module 330. The object extraction module 330 can be adapted to read the attributes 315, 320, 325, 316, 321, and 326, records 311 and 313, and tables 310 that make up a business object and generate an indexed composite document 340. Generating the indexed composite document 340 can comprise reading the value of an attribute 315 of the business object and storing the value 345 in the indexed composite document 340. In some cases, the value of the attribute can be converted to text and the text can be stored as the indication of the value 345 of the attribute. Metadata 350 can be assigned to and/or associated with the value 345 of the attribute. The metadata 350 may not be indicated by the attributes of the business object but can identify the attribute 345 to which it corresponds and may also comprise text. In some cases, storing the indication of the value 345 of the attribute in the indexed composite document 340 can comprise concatenating the indication of the value 345 of the attribute and the assigned metadata 350 to the indexed composite document 340. That is, the indexed composite document 340 can consist of a set of attribute values 345-347 with one or more pieces of metadata 350-352 associated with some or all of the values 345-347.

Generating the indexed composite document 340 can be performed periodically, for example, as part of a batch process performed at a designated time, upon the expiration of a time since a previous conversion process, upon an update to the business object, in response to a request for a search, or upon the occurrence of another event or condition. Basically, the process comprises reading the values of the attributes of the business object and assigning metadata to those values. The metadata can be assigned via a manual operation, i.e., via instructions and/or input from a human operator, or through an automated process, for example, by generating the metadata based on the names of the attributes or other information, or by a combination of an automated process and manual operations. An exemplary process for generating an indexed composite document is described below with reference to FIG. 4.

The system 300 can also include a keyword search engine 355 and a user interface 360. The business object can be searched by the keyword search engine 355 based on criteria provided by a user via the user interface 360. Searching the business object can comprise applying a keyword search to the indexed composite document 340 to identify those keywords, i.e., metadata, and thus the corresponding attributes, records, and tables of the business object matching the user's criteria. Results of searching the business object can be presented by the keyword search engine 355 via the user interface 360. According to one embodiment, the results can be presented ordered by relevance. That is, searching one or more business objects can comprise receiving a set of search criteria via a user interface 360 and applying a keyword search 355 to the indexed composite document 340 to identify attributes of the business object that match the search criteria. Searching the indexed composite document 340 can comprise performing a keyword search on the metadata 350-351 and/or attribute values 345-347 of the composite document 340 based on the search criteria. An indication of the identified attributes of the business object can be returned via the user interface 360. Returning the indication of the identified attributes can comprise returning the indications of the values of the attributes that match the search criteria and the associated metadata from the indexed composite document 340. The indications of the values of the attributes and the associated metadata can be ordered by relevance to the search criteria. An exemplary process for performing such a search is described below with reference to FIG. 5.

In some cases, the search criteria can be recorded by the search engine 355, for example in a search records repository 370. In such a case, the metadata 350-352 of the indexed composite document 340 can be updated or expanded, for example via update module 365, based on historical data, i.e., based on the search criteria saved in the search records repository 370. Updating the metadata 350-352 of the indexed composite document 340 can be via a manual operation, i.e., via instructions and/or input from a human operator, or through an automated process, for example, by generating the metadata based on the names of the attributes or other information, or by a combination of an automated process and manual operations. Generally speaking, attributes of the business object represented in the composite document and associated with the recorded search criteria can be identified and the metadata associated with the indication of the value of the identified attributes can be updated based on the recorded search criteria. An exemplary process for updating the indexed composite document is described below with reference to FIG. 6.

Therefore, in use, the system 300 provides for searching a business object based on the indexed composite document 330 separate from but representing the attributes 315, 320, 325, 316, 321, and 326, records 311 and 313, and tables 310 that make up a business object. The indexed composite document 340 can include all or some subset of all values in related tables 310 making up a business object and concatenated together into the document 340. That is, the indexed composite document 340 can represent the values 345-347 of the attributes making up the business object and the relationships between the attributes and tables. Such a document 340 can then be indexed with metadata 350-352 describing the attributes so that the business attribute can be searched by applying a keyword search 355 to the metadata 350-352 of the indexed composite document 340. For example, the metadata 350-352 can include text describing the attribute values 345-347 stored in the indexed composite document 340 but that is different from attribute names or other information included in the original tables 310. Therefore, a keyword search 355 performed on the metadata 350-352 of the indexed composite document 340 can identify attribute values that would not be found by a typical query of the tables 310 making up the business object.

For example, a business object may be made up of a table, e.g., an "Employee" table, with a record having the following attributes: ID (e.g., with a value of "1"); NAME (e.g., with a value of "Alan"); PH_NUM (e.g., with a value of "555-1234"); and HR_MAN_ID (e.g., having a value of "10"). Via the HR_MAN_ID attribute, this record can be linked to another table, e.g., an "HR_Managers" table, with a record having the following attributes: ID (e.g., with a value of "10") and NAME (e.g., Teresa). An indexed composite document can be generated based on these records that includes the attribute values "Alan", "555-1234", and "Teresa". Additionally, metadata describing these attribute values can be added to the document as described above. For example, a metadata tag of "Phone Number" may be added to the indexed composite document and associated with the value "555-1234" while a tag of "HR Manager" can be added to the indexed composite document and associated with the value "Teresa." Thus, a search for "alan hr manager" would retrieve these values where a typical query of the relevant tables would return nothing.

Figure 4:
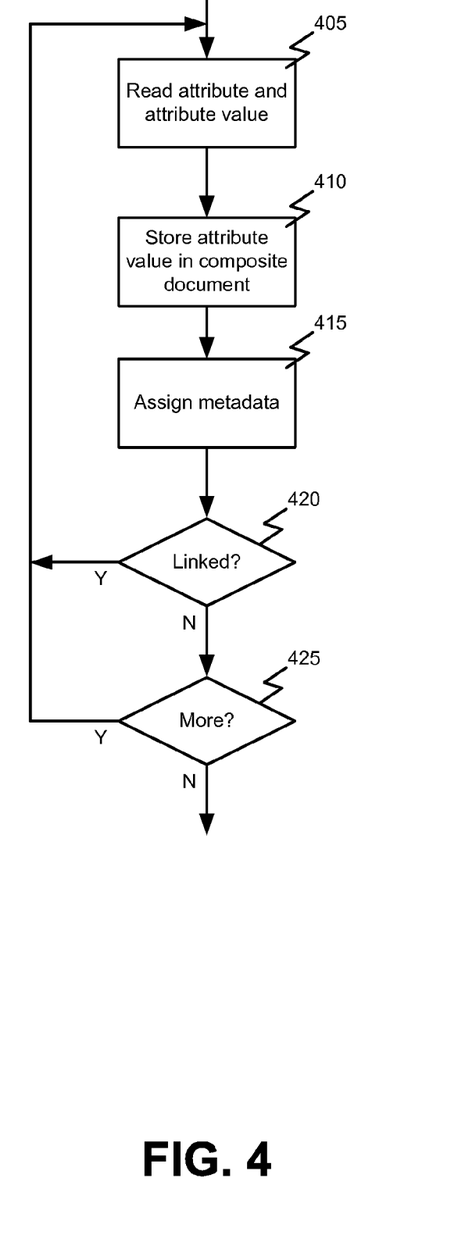
FIG. 4 is a flowchart illustrating a process for generating an indexed composite document according to one embodiment of the present invention.

FIG. 4 is a flowchart illustrating a process for generating an indexed composite document according to one embodiment of the present invention. As noted above, such a process can be performed periodically, for example, as part of a batch process performed at a designated time, upon the expiration of a time since a previous conversion process, upon an update to the business object, in response to a request for a search, or upon the occurrence of another event or condition. In this example, the process begins with reading 405 an attribute or attribute value from the business object. An indication of the value of the attribute can be stored 410 in the indexed composite document. In some cases, the value of the attribute can be converted to text and the text can be stored 410 as the indication of the value of the attribute. The metadata can be assigned 415 to the value of the attribute. The metadata may not be indicated by the attributes of the business object but can identify the attribute and may also comprise text.

A determination 420 can be made as to whether the identified attribute is linked to another table. In response to determining 420 the attribute is linked to another table, the process can continue with reading an attribute and/or value indicated by the link. In response to determining 420 the attribute is not linked to another table, a determination 425 can be made as to whether additional attributes remain in the business object to be added to the indexed composite document, this determination 425 can be made based on whether additional attributes remain to be read, i.e., whether an end of the record or table has been reached, or based on another criteria such as a predetermined or predefined set of attributes to read having been completed. In response to determining 425 additional attributes remain to be added to the indexed composite document, processing can continue with reading 405 the next attribute and/or value. Thus, as noted above, processing can continue with storing 410 the indication of the value of the attribute and assigning metadata 415 in the indexed composite document by concatenating the indication of the value of the attribute and the assigned metadata to the indexed composite document until all or some subset of all attributes of the business object have been completed.

Figure 5:
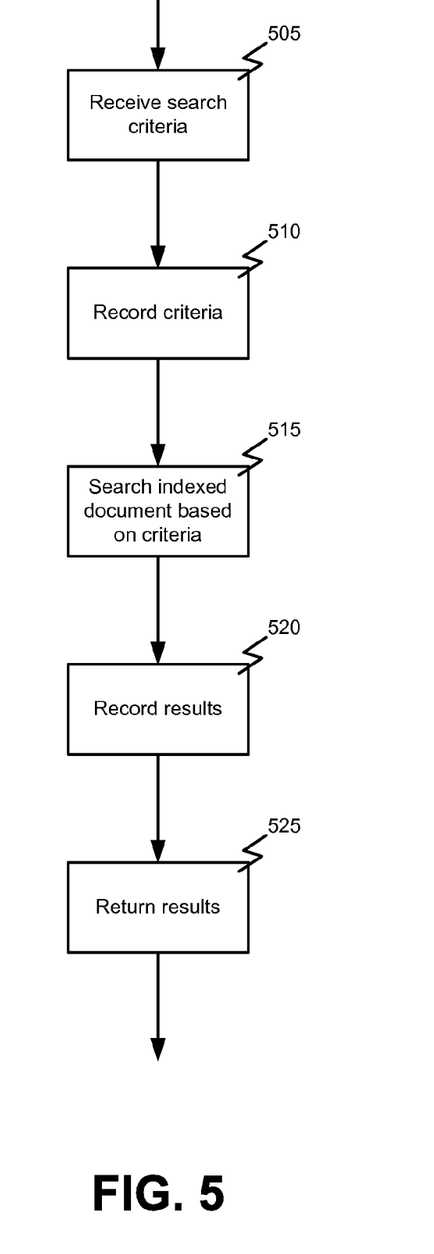
FIG. 5 is a flowchart illustrating a process for searching one or more business objects according to one embodiment of the present invention.

FIG. 5 is a flowchart illustrating a process for searching one or more business objects according to one embodiment of the present invention. In this example, the process begins with receiving 505 a set of search criteria. In some cases, the search criteria can be recorded 510, i.e., a history of search criteria can be maintained for later updating of the metadata of the indexed composite document as described above. The indexed composite document representing the business object can be searched 515 based on the search criteria. As described, the indexed composite document can comprise an indication of a value of one or more attributes of the business object and metadata associated with at least one of the values. Searching 515 the indexed composite document can comprise performing a keyword search on the metadata of the composite document based on the search criteria. In some cases, the results of the search can also be saved 520. An indication of the identified attributes of the business object can be returned 525. Returning 525 the indication of the identified attributes can comprise returning 525 the indications of the values of the attributes that match the search criteria and the associated metadata from the indexed composite document. As noted, the indications of the values of the attributes and the associated metadata can be ordered by relevance to the search criteria.

Figure 6:
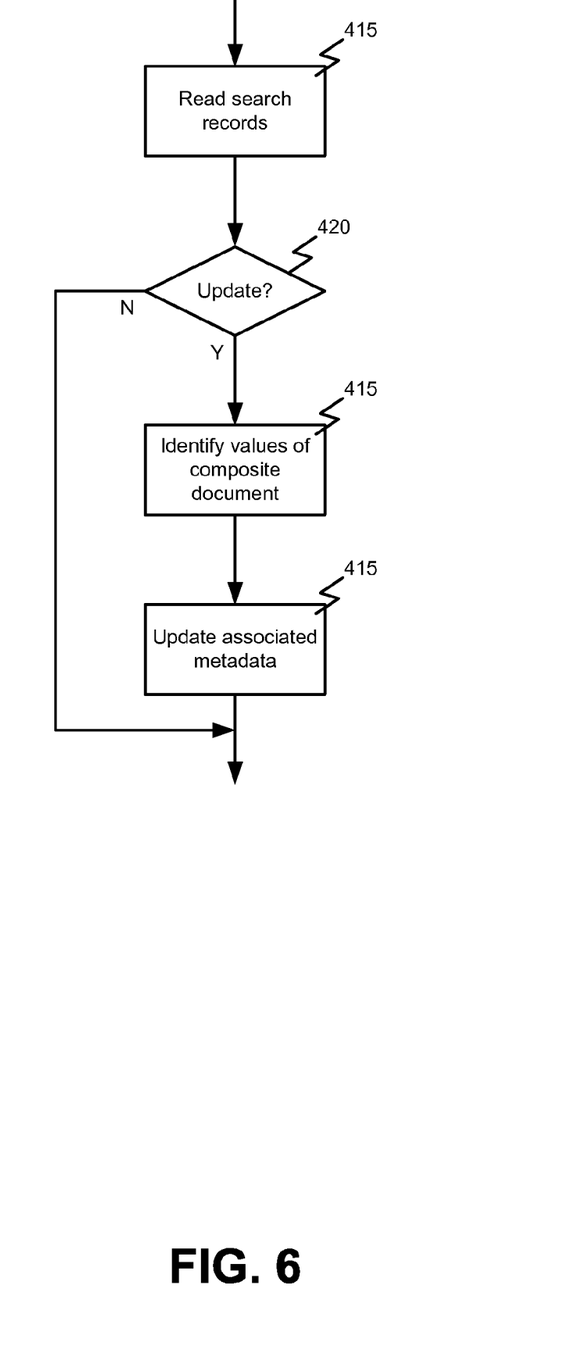
FIG. 6 is a flowchart illustrating a process for updating an indexed composite document according to one embodiment of the present invention.

FIG. 6 is a flowchart illustrating a process for updating an indexed composite document according to one embodiment of the present invention. As noted above, such a process can be performed periodically, for example, as part of a batch process performed at a designated time, upon the expiration of a time since a previous conversion process, upon an update to the business object, in response to a request for a search, or upon the occurrence of another event or condition. In this example, the process begins with reading 415 the recorded search records. A determination 420 can be made as to whether to update the metadata of the indexed composite document. This determination can be based, for example, on whether commonly occurring search criteria are included in the metadata. In response to determining 420 to update the metadata of the indexed composite document, attributes of the business object represented in the composite document and associated with the recorded search criteria can be identified 415 and the metadata associated with the indication of the value of the identified attributes can be updated 415 based on the recorded search criteria.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of searching one or more business objects, the method comprising:
    generating an indexed composite document, the indexed composite document representing a plurality of attributes of a business object and including at least one attribute from each of a plurality of tables, wherein the indexed composite document comprises an indication of a value of each of the plurality of attributes of the business object and metadata associated with each of the values and represents relationships between the attributes and each of the plurality of tables, and wherein generating the indexed composite document comprises reading the value of each of the attributes of the business object, storing the indication of the value of each attribute in the indexed composite document, and assigning the metadata to the value of each attribute, wherein the metadata identifies the attribute but is different from an attribute name for the attribute in the table;
    receiving a set of search criteria;
    recording the search criteria;
    identifying attributes of the business object that match the search criteria by searching the indexed composite document;
    returning an indication of the identified attributes of the business object;
    identifying attributes of the business object represented in the composite document and associated with the recorded search criteria; and
    updating the metadata associated with the indication of the value of the identified attributes based on the recorded search criteria, wherein updating the metadata associated comprises expanding the metadata for one or more attributes of the business object in the composite indexed document to include metadata based on the recorded search criteria and wherein the recorded search criteria are assigned to the added metadata to further describe the associated attribute.

2. The method of claim 1, wherein searching the indexed composite document comprises performing a keyword search on the metadata of the composite document based on the search criteria.

3. The method of claim 1, further comprising converting the value of each attribute to text and storing the text as the indication of the value of the attribute.

4. The method of claim 3, wherein storing the indication of the value of each attribute in the indexed composite document comprises concatenating the indication of the value of each attribute and the assigned metadata to the indexed composite document.

5. The method of claim 4, wherein the metadata comprises text.

6. The method of claim 1, wherein returning the indication of the identified attributes comprises returning the indications of the values of the attributes that match the search criteria and the associated metadata from the indexed composite document, wherein the indications of the values of the attributes and the associated metadata are ordered by relevance to the search criteria.

7. The method of claim 1, wherein the metadata is not indicated by the attributes of the business object.

8. A system comprising:
    a processor; and
    a memory communicatively coupled with and readable by the processor, the memory having stored therein a series of instructions which, when executed by the processor, cause the processor to:
        generate an indexed composite document, the indexed composite document representing a plurality of attributes of a business object and including at least one attribute from each of a plurality of tables, wherein the indexed composite document comprises an indication of a value of each of the plurality of attributes of the business object and metadata associated with each of the values and represents relationships between the attributes and each of the plurality of tables, and wherein generating the indexed composite document comprises reading the value of each of the attributes of the business object, storing the indication of the value of each attribute in the indexed composite document, and assigning the metadata to the value of each attribute, wherein the metadata identifies the attribute but is different from an attribute name for the attribute in the table,
        receive a set of search criteria,
        record the search criteria,
        identify attributes of the business object that match the search criteria by searching the indexed composite document,
        return an indication of the identified attributes of the business object,
        identify attributes of the business object represented in the composite document and associated with the recorded search criteria, and
        update the metadata associated with the indication of the value of the identified attributes based on the recorded search criteria, wherein updating the metadata associated comprises expanding the metadata for one or more attributes of the business object in the composite indexed document to include metadata based on the recorded search criteria and wherein the recorded search criteria are assigned to the added metadata to further describe the associated attribute.

9. The system of claim 8, wherein searching the indexed composite document comprises performing a keyword search on the metadata of the composite document based on the search criteria.

10. The system of claim 8, wherein returning the indication of the identified attributes comprises returning the indications of the values of the attributes that match the search criteria and the associated metadata from the indexed composite document, wherein the indications of the values of the attributes and the associated metadata are ordered by relevance to the search criteria.

11. A machine-readable storage device having stored thereon a series of instruction which, when executed by a processor, cause the processor to search one or more business objects by:

generating an indexed composite document, the indexed composite document representing a plurality of attributes of a business object and including at least one attribute from each of a plurality of tables, wherein the indexed composite document comprises an indication of a value of each of the plurality of attributes of the business object and metadata associated with each of the values and represents relationships between the attributes and each of the plurality of tables, and wherein generating the indexed composite document comprises reading the value of each of the attributes of the business object, storing the indication of the value of each attribute in the indexed composite document, and assigning the metadata to the value of each attribute, wherein the metadata identifies the attribute but is different from an attribute name for the attribute in the table;

receiving a set of search criteria;

recording the search criteria;

identifying attributes of the business object that match the search criteria by searching the indexed composite document;

returning an indication of the identified attributes of the business object;

identifying attributes of the business object represented in the composite document and associated with the recorded search criteria; and updating the metadata associated with the indication of the value of the identified attributes based on the recorded search criteria, wherein updating the metadata associated comprises expanding the metadata for one or more attributes of the business object in the composite indexed document to include metadata based on the recorded search criteria and wherein the recorded search criteria are assigned to the added metadata to further describe the associated attribute.

12. The machine-readable storage device of claim 11, wherein searching the indexed composite document comprises performing a keyword search on the metadata of the composite document based on the search criteria.

13. The machine-readable storage device of claim 11, wherein returning the indication of the identified attributes comprises returning the indications of the values of the attributes that match the search criteria and the associated metadata from the indexed composite document, wherein the indications of the values of the attributes and the associated metadata are ordered by relevance to the search criteria.

* * * * *

UNITED STATES PATENT AND TRADEMARK OFFICE
CERTIFICATE OF CORRECTION

| | | |
|---|---|---|
| PATENT NO. | : 8,108,380 B2 | Page 1 of 1 |
| APPLICATION NO. | : 12/041011 | |
| DATED | : January 31, 2012 | |
| INVENTOR(S) | : Fothergill | |

It is certified that error appears in the above-identified patent and that said Letters Patent is hereby corrected as shown below:

On sheet 3 of 6, in figure 3, in line 1, delete "Database/Repositroy" and insert -- Database/Repository --, therefor.

In column 5, line 54, after "network" delete "may".

In column 10, line 10, delete "document, this" and insert -- document. This --, therefor.

In column 10, line 34, delete "criteria" and insert -- criteria. --, therefor.

Signed and Sealed this
First Day of May, 2012

David J. Kappos
*Director of the United States Patent and Trademark Office*